United States Patent
Shirai

(10) Patent No.: US 6,746,142 B2
(45) Date of Patent: Jun. 8, 2004

(54) HEADLAMP FOR AUTOMOBILE WITH AIMING SCREW HAVING LOCKING PORTION

(75) Inventor: Katutada Shirai, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 26 days.

(21) Appl. No.: 10/029,203

(22) Filed: Dec. 28, 2001

(65) Prior Publication Data

US 2002/0085385 A1 Jul. 4, 2002

(30) Foreign Application Priority Data

Dec. 28, 2000 (JP) ...................... P2000-400073

(51) Int. Cl.[7] ............................................. F21V 19/02
(52) U.S. Cl. ................. 362/524; 362/528; 254/103; 248/288.31
(58) Field of Search ................ 362/487, 506, 362/507, 523, 524, 528, 529, 530, 531, 532; 254/95–97, 99, 100, 101–103; 411/81, 378, 508–510; 248/188.4, 274.1, 288.11, 288.31

(56) References Cited

U.S. PATENT DOCUMENTS

| | | | | |
|---|---|---|---|---|
| 5,381,313 A | * | 1/1995 | Choji | 362/524 |
| 5,444,603 A | | 8/1995 | Otsuka et al. | |
| 5,508,896 A | * | 4/1996 | Suehiro et al. | 362/528 |
| 5,546,283 A | | 8/1996 | Ohtsuka et al. | |
| 5,580,149 A | * | 12/1996 | Kusagaya | 362/528 |
| 5,678,915 A | * | 10/1997 | Shirai et al. | 362/528 |
| 6,017,136 A | * | 1/2000 | Burton | 362/273 |
| 6,315,438 B1 | * | 11/2001 | Shirai et al. | 362/507 |
| 6,502,972 B2 | * | 1/2003 | Matsubara | 362/507 |

FOREIGN PATENT DOCUMENTS

| | | |
|---|---|---|
| JP | 2000-149624 | 5/2000 |
| JP | 2001-114014 | 4/2001 |

* cited by examiner

Primary Examiner—Alan Cariaso
Assistant Examiner—Ismael Negron
(74) Attorney, Agent, or Firm—Sughrue Mion, PLLC

(57) ABSTRACT

A headlamp for an automobile includes a lamp body, a light source, a reflector, and an aiming mechanism. The aiming mechanism includes a screw insertion hole and an aiming screw operable to move the reflector by pivoting the aiming screw. The aiming screw includes a supported portion supported by the screw insertion hole, a male screw portion forward from the supported portion, and a pivotal movement operating force transmitted portion rearward from the supported portion. A front end side of the supported portion includes an elastic locking portion operable to pass through the screw insertion hole by being deformed elastically to an inner side in a radial direction, and a rear end side of the supported portion is integrally formed with an elastic rib brought into press contact with a peripheral edge portion on a rear end side of the screw insertion hole to fixedly position the aiming screw.

13 Claims, 16 Drawing Sheets

HEADLAMP FOR AUTOMOBILE WITH AIMING SCREW HAVING LOCKING PORTION

BACKGROUND OF THE INVENTION

1. Field of the Invention

The present invention relates to a headlamp for an automobile of a reflector movable type in which a reflector mounted with a light source is inclinably supported by a lamp body by an aiming mechanism. More particularly, the present invention relates to a headlamp for an automobile in which the aiming mechanism may include an aiming screw rotatably supported by a screw insertion hole.

2. Description of the Related Art

As shown by FIG. 19, according to a conventional headlamp for an automobile of this kind, a reflector 2, integrally mounted with a light source, is supported by an aiming mechanism. In a conventional headlamp, the aiming mechanism is constituted by a ball and socket joint (not illustrated) constituting an aiming fulcrum, and two nut members (nut member screwed to aiming screw 4 is designated by notation 5) respectively screwed to two aiming screws (one aiming screw is designated by notation 4). With this configuration, the reflector is made extractable and retractable in an axial direction, on a front face side of a lamp body 1.

More specifically, the aiming screw 4 is rotatably supported by a screw insertion hole 1a and a screw portion 4a of the aiming screw 4 extended to a front side of the lamp body 1, and screwed with the nut member 5 attached to the reflector 2. By pivoting the aiming screw 4, the nut member 5 is extracted and retracted along the aiming screw 4, and the reflector 2 is inclined around an inclining axis connecting the ball and socket joint and the nut member screwed to other aiming screw to thereby enable adjustment of an optical axis of the lamp.

The aiming screw 4 is made of metal, and a rear end portion thereof is integrally formed with a crowned gear 7 so that aiming screw 4 can be operated to pivot by using a driver D. Further, the aiming screw 4 inserted into the screw insertion hole 1a from a rear side of the lamp body 1, is elastically supported and fixedly positioned in a front and rear direction by a push-on fix 8 made of metal.

Additionally, the screw insertion hole 1a, for rotatably supporting the aiming screw 4, is interposed with an O-ring 9 to thereby waterproof a rotational support portion of the aiming screw 4.

However, according to the above-described conventional technology, it is necessary to provide the O-ring 9 for ensuring waterproofing at the rotational support portion of the aiming screw 4. Also, the push-on fix 8 for positioning the aiming screw 4 in the front and rear direction is required. These two components help to increase the number of parts of the aiming mechanism, therefore, the assembly of the headlamp becomes more difficult. Particularly, interposing the push-on fix 8 at a predetermined position of the aiming screw 4 is considerably laborious because the pinching force by the push-on fix 8 is very strong.

Hence, in Japanese Patent Application Publication No. 2001-114014, as shown by FIGS. 20 and 21, the applicant proposed a structure in which a screw insertion hole 102 is constituted by a cylindrical member 100 formed at a lamp body 1A and having vertical slits 104 at a front end side of the cylindrical member 100 to form locking portions 106 at the front end side of the cylindrical member 100. These locking portions 106 deform elastically when the aiming screw is inserted into the screw insertion hole 102 from a rear side of the lamp body 1A. That is, the aiming screw pushes to expand the locking portions 106 on the front end side of the cylindrical portion to an outer side in the radial direction, wherein a supported portion of the aiming screw is contained in the screw insertion hole and the aiming screw can simply be positioned fixedly to the screw insertion hole 102.

However, although the aiming screw can simply be positioned fixedly to the screw insertion hole 102, when the aiming screw is inserted into the screw insertion hole 102, a considerable pressing force is needed to push, and thereby widen, the comparatively thick locking portions 106 on the front end side of the cylindrical portion. As such, more time is required to mount the aiming screw, and also, a pressing machine having sufficient pressing force is needed for inserting the aiming screw.

Further, although the cylindrical portion 100 is integrally formed with the lamp body 1A, since the shape of the front end side of the cylindrical portion 100 (shape of locking portion 106) is complicated, forming dies to make this structure is also complicated due to the difficulty in machining of the forming faces of the dies. This also leads to increased time and cost for manufacturing the dies.

SUMMARY OF THE INVENTION

The present invention has been carried out in view of the above-described problems of the conventional technology and it is an object of the invention to provide a headlamp for an automobile of a reflector movable type wherein the mounting of an aiming screw into a screw insertion hole is performed smoothly and simply without using a push-on fix or requiring the use of complicated dies.

In order to achieve the above-described object, according to a first aspect of the invention, there is provided a reflector moveable type headlamp for an automobile which comprises:

a lamp body;

a light source;

a reflector positioned to reflect light originating from the light source; and an aiming mechanism interposed between the lamp body and the reflector and operable to inclinably support and move the reflector relative to the lamp body;

wherein the aiming mechanism includes:

a screw insertion hole including a cylindrical portion; and an aiming screw operable to move the reflector by pivoting the aiming screw, the aiming screw including a supported portion supported by the screw insertion hole, a male screw portion forward from the supported portion, and a pivotal movement operating force transmitted portion rearward from the supported portion, wherein a front end side of the supported portion includes an elastic locking portion operable to pass through the screw insertion hole by being deformed elastically to an inner side in a radius direction and engage with a peripheral edge portion on a front end side of the screw insertion hole to prevent the aiming screw from drawing in a rear direction, and a rear end side of the supported portion is integrally formed with an elastic rib brought into press contact with a peripheral edge portion on a rear end side of the screw insertion hole to fixedly position the aiming screw.

Accordingly, when the aiming screw is pushed into the screw insertion hole from a rear face side of the lamp body, the elastic locking portion on the front end side of the supported portion of the aiming screw is pushed by the peripheral edge portion on the rear end side of the screw insertion hole and an inner peripheral face of the hole to elastically deform to contract to the inner side in the radial direction and slide in the screw insertion hole.

Further, when the supported portion of the aiming screw is pushed into the screw insertion hole by a force equal to or larger than a spring force which the elastic rib receives from the peripheral edge portion of the rear end side of the screw insertion hole, and when the elastic locking portion passes through the screw insertion hole, the elastic locking portion recovers to an outer side in the radial direction and engages with a peripheral edge portion on the front end side of the screw insertion hole to thereby prevent the aiming screw from drawing in the rear direction. Also, the elastic rib on the rear end side of the supported portion is brought into a press contact state with the peripheral edge portion on the rear end side of the screw insertion hole to thereby fixedly position the aiming screw to the screw insertion hole in an axial direction.

Whereas according to Japanese Patent Application Publication No. 2001-114014 (refer to FIGS. 20, 21), when the aiming screw is inserted into the screw insertion hole, a large aiming screw pushing force is required for pushing the comparatively thick-walled locking portion on the front end side of the cylindrical portion to expand and elastically deform to the outer side of the radius direction. According to the first aspect of the present invention, the elastic locking portion formed at the supported portion of the aiming screw is easy to elastically deform to the inner side in the radial direction and accordingly, the aiming screw pushing force may be small. That is, a section modulus of a cross face of the elastic locking portion formed on the side of the aiming screw is smaller than a section modulus of a cross face of the elastic locking portion formed at the cylindrical portion in Japanese Patent Application Publication No. 2001-114014. As such, the elastic locking portion formed at the supported portion is made to deform elastically within the screw insertion hole.

Further, in the present invention, either of the elastic rib or the lamp body (cylindrical portion) may be made of synthetic resin and at a sliding contact portion between the elastic rib and the peripheral edge portion of the screw insertion hole, the elastic rib and the lamp body are ensured to slide and not hamper pivotal movement of the aiming screw. Also, the elastic rib made of synthetic resin is less deteriorated by water than a conventional O-ring made of rubber.

Finally, the screw insertion hole constituted by the cylindrical portion of the present invention is simpler in configuration than the cylindrical portion in Japanese Patent Application Publication No. 2001-114014 and therefore, forming dies and shaping the forming face are also simplified.

According to a second aspect of the present invention, there is provided the reflector movable type headlamp for an automobile, wherein the elastic locking portions include locking pieces in the shape of a tongue piece provided at a plurality of locations at equal intervals in a peripheral direction of the supported portion and extended in a rear direction.

Therefore, in operation, a plurality of the locking pieces in the shape of the tongue piece are uniformly deformed to the inner side and the supported portion is smoothly inserted into the screw insertion hole.

Further, the plurality of locking pieces in the shape of the tongue piece are uniformly brought into press contact with positions of the peripheral edge portions on the front end side of the screw insertion hole at equal intervals in the peripheral direction to thereby guarantee smooth pivotal movement of the aiming screw.

In addition, particularly, when the elastic locking portions are constituted by a pair of the opposed locking pieces in the shape of the tongue piece, divided dies having a parting line crossing outer side faces of the locking pieces in the shape of the tongue piece in the vertical direction may be used to form the supported portion, and thereby facilitate forming the supported portion.

Further, the locking piece in the shape of the tongue piece can be formed to be in an L-like shape in a vertical section thereof and made thick-walled toward a front end side of a horizontal extended portion thereof.

When constituted in this way (when the locking piece in the shape of the tongue piece is formed to be thick-walled toward the front end side of the horizontal extended portion), in inserting the aiming screw (supported portion) into the screw insertion hole, the locking piece in the shape of the tongue piece, an inserted side of which is converging, is brought into contact with the peripheral edge portion of the screw insertion hole to thereby elastically deform to the inner side in the radial direction and can therefore invade smoothly inside of the screw insertion hole. Further, since the front end portion of the locking piece in the shape of the tongue piece is thick-walled, an area of the locking piece in the shape of the tongue piece engaging with the front end face of the cylindrical portion is large and accordingly, the locking piece in the shape of the tongue piece becomes difficult to detach from the front end face of the cylindrical portion.

According to a third aspect of the present invention, the elastic rib may be formed in a skirt-like shape.

In operation, the skirt-like elastic rib is uniformly brought into press contact with a total periphery of the peripheral edge portion on the rear end side of the screw insertion hole to thereby support the aiming screw without play and also hamper or prevent water from invading the screw insertion hole.

According to a fourth aspect of the present invention, the pivotal movement operating force transmitted portion may be constituted by a crowned gear directing teeth thereof in the front direction, the screw insertion hole may be constituted by the cylindrical portion penetrating the lamp body in the front and rear direction and extended in the front and rear direction, and an outer peripheral face of a rear extended portion of the cylindrical portion may be provided with a tool positioning contact portion for positioning a front end portion of a tool used to pivot the crowned gear.

In operation, by prolonging a length of the screw insertion hole in the front and rear direction, the aiming screw can be held without play and waterproof performance at a rotational support portion of the aiming screw is also promoted.

Further, when a front end portion of the tool, such as driver arranged along the lamp body, is brought into contact with the tool positioning contact portion for pivoting the aiming screw, teeth of the tool may be held in mesh with teeth of the crowned gear portion to thereby facilitate and ensure pivotal operation of the aiming screw.

According to a fifth aspect of the present invention, an outer peripheral face of the supported portion may be integrally formed with an elastic waterproof rib in a ring-like shape brought into sliding contact with an inner peripheral face of the screw insertion hole.

In operation, the elastic waterproof rib in the ring-like shape formed at the supported portion of the aiming screw and brought into sliding contact with the inner peripheral face of the screw insertion hole, is held by the inner peripheral face of the screw insertion hole in a press contact state to thereby waterproof or provide a seal at the rotational support portion of the aiming screw.

Further, the waterproof rib may be made of synthetic resin and provided with elasticity and flexibility and accordingly, elastically deformed when the supported portion of the aiming screw is inserted into the cylindrical portion (screw insertion hole). This configuration does not hamper integration of the aiming screw into the screw insertion hole and the sliding contact portion between the elastic waterproof rib and the inner peripheral face of the screw insertion hole does not hamper pivotal movement of the aiming screw.

Further, a waterproof rib made of synthetic resin is less deteriorated by water than an O-ring made of rubber.

According to a sixth aspect of the present invention, both the entire aiming screw or the cylindrical portion may be integrally formed with synthetic resin. In operation, for example, since the entire aiming screw is formed by synthetic resin, it is light-weighted.

According to a seventh aspect of the present invention, the aiming screw is screwed with a nut member constituting an aiming mechanism constituent member mounted to the reflector and the nut member is carried by a nut sliding guide formed integrally with the lamp body and extended in parallel with the aiming screw.

In operation, the nut member constituting an aiming point is carried by the nut sliding guide integrally formed with the lamp body and therefore, weight of the reflector is not operated to the screw insertion hole constituting the rotational supporting portion of the aiming screw.

DETAILED DESCRIPTION OF THE INVENTION

Figure 1:
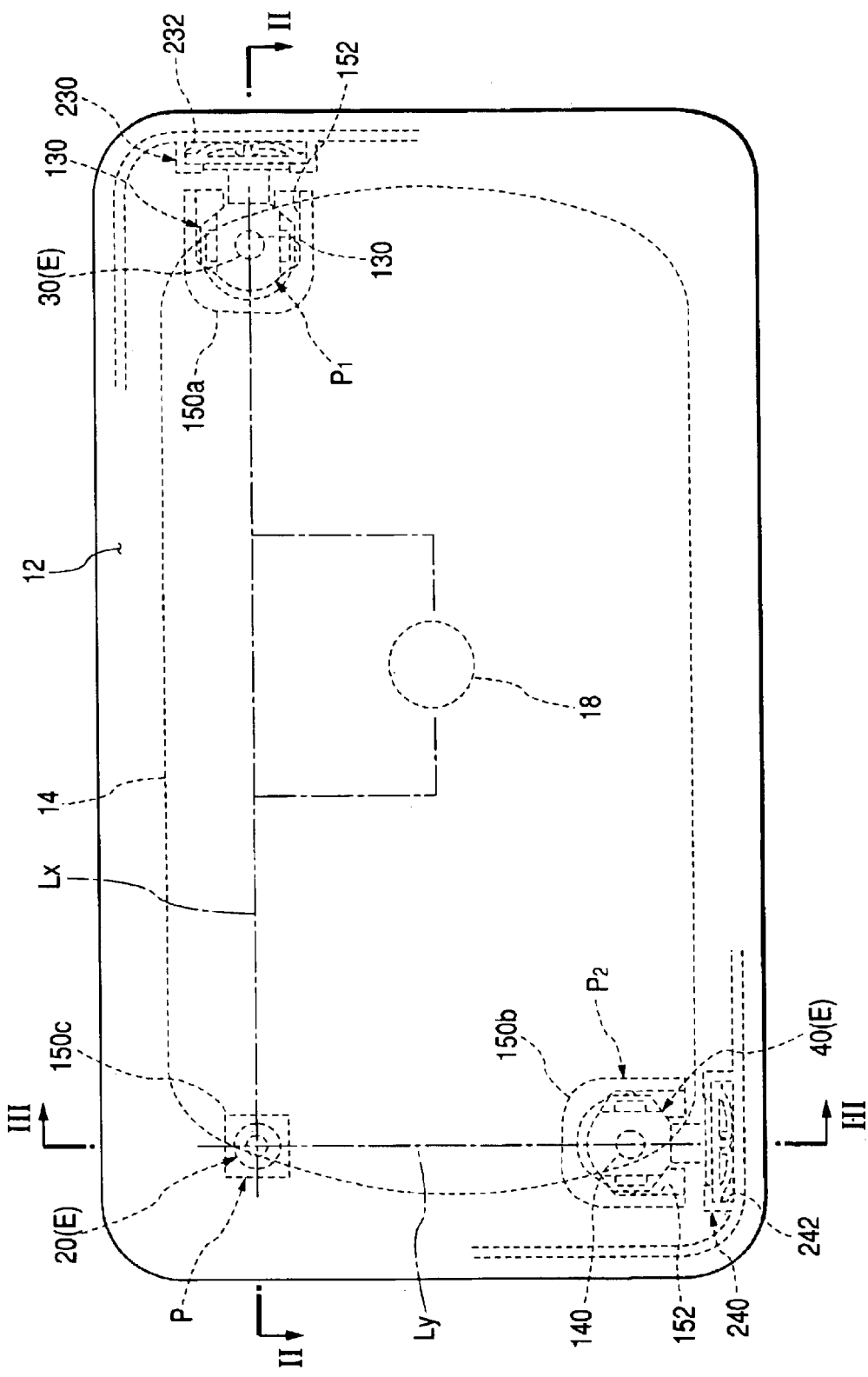
FIG. 1 is a front view of a headlamp for an automobile according to a first embodiment of the invention.
Figure 2:
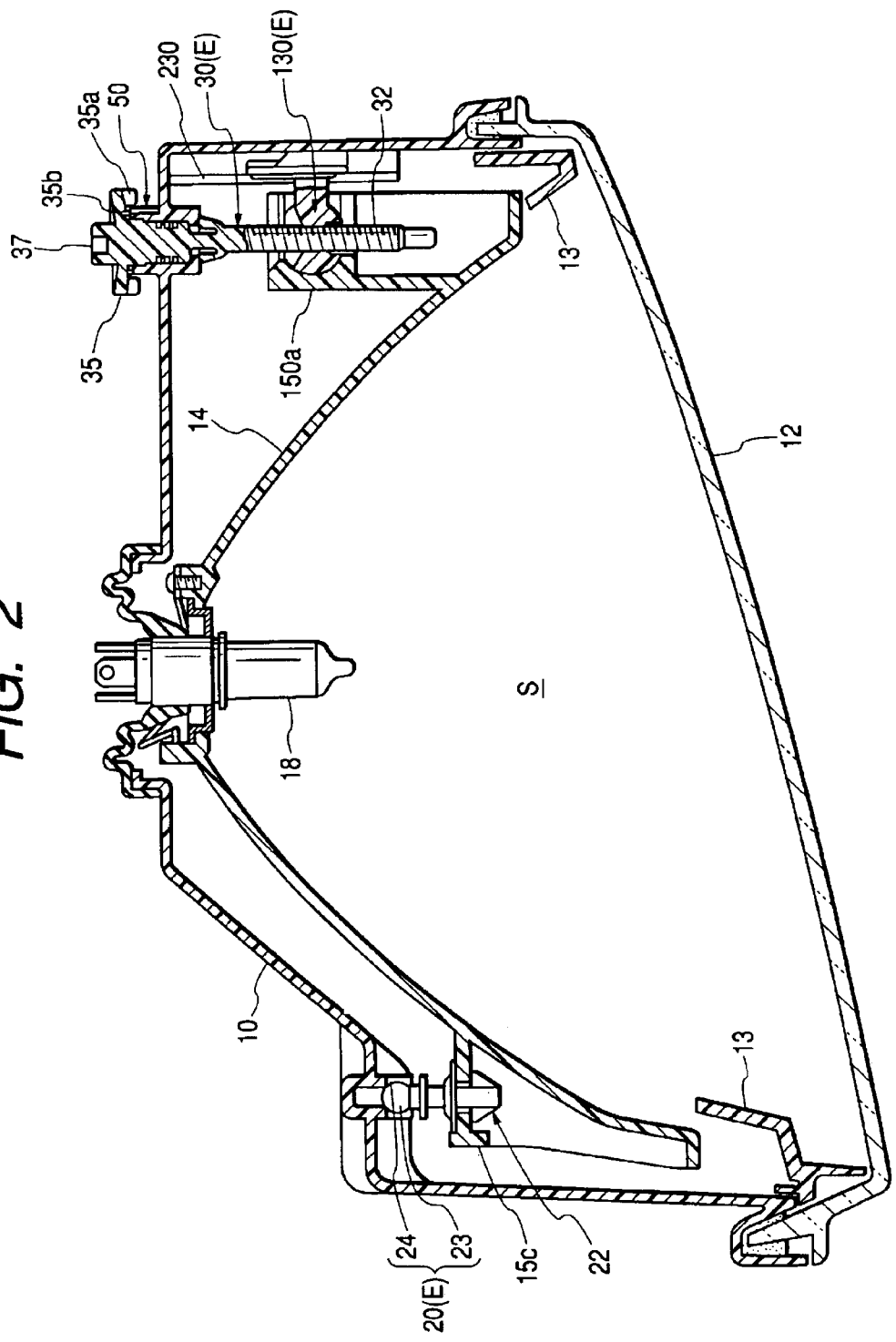
FIG. 2 is a horizontal sectional view (sectional view taken along a line II—II shown in FIG. 1) of the headlamp.
Figure 3:
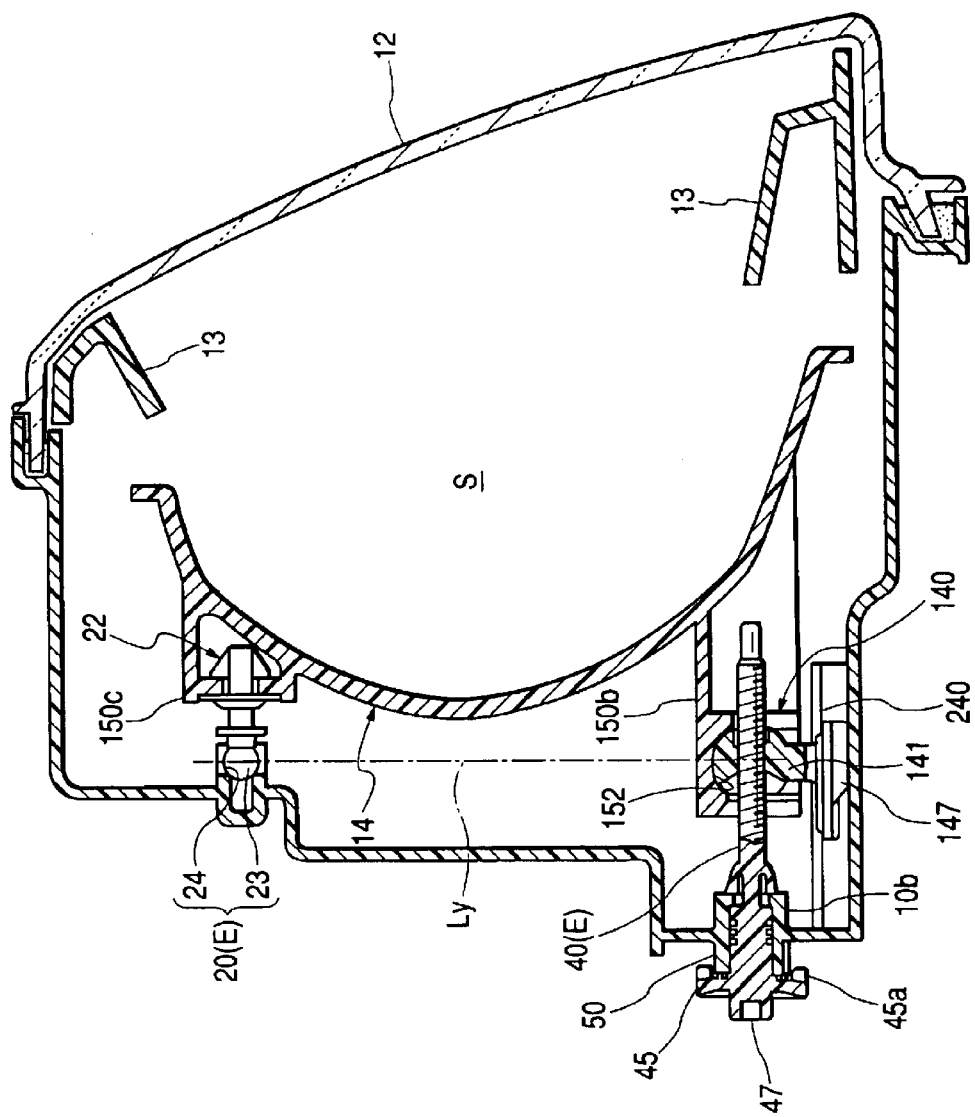
FIG. 3 is a vertical sectional view (sectional view taken along a line III—III shown in FIG. 1) of the headlamp.
Figure 4:
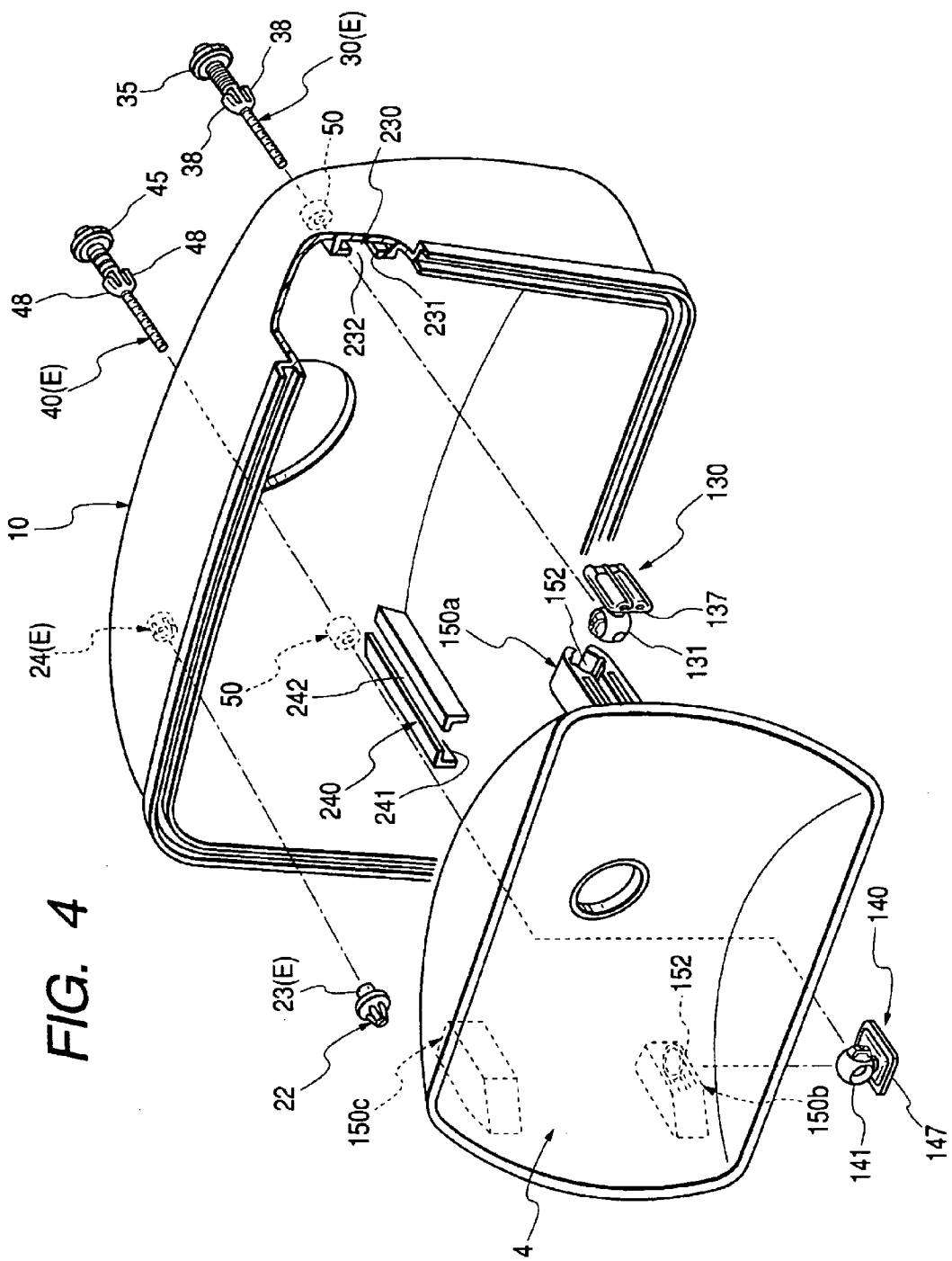
FIG. 4 is a disassembled perspective view of a lamp body, a reflector, and an aiming mechanism.

Next, embodiments of the present invention are described using the aforementioned drawings.

According to a first embodiment of the present invention as shown in FIGS. 1 through 17, notation 10 designates a lamp body in a vessel-like shape made of, for example, polypropylene wherein a front face opening portion of the lamp body 10 may be integrated with a front face lens 12 to thereby partition a lamp chamber S. At an inside of the lamp chamber S, there is provided a reflector 14 that may be integrally mounted with a bulb 18 constituting a light source. The reflector 14 may be inclinably supported by an aiming mechanism E. Notation 13 designates an extension reflector arranged between the reflector 14 and the front face lens 12 for concealing a gap between the reflector 14 and the lamp body 10 and making the entire inside of the lamp chamber S look in a mirror face color.

The aiming mechanism E may comprise a ball and socket joint 20 interposed between the lamp body 10 and the reflector 14 for constituting an aiming fulcrum P, a pair of aiming screws 30 and 40 rotatably supported respectively by screw insertion holes 10a and 10b provided at the lamp body 10, and a pair of nut members 130 and 140 respectively attached to brackets 150a and 150b projected at a back face side of the reflector 14 and respectively screwed to screw portions 32 and 42 of the aiming screws 30 and 40 for constituting aiming points P1 and P2.

Notation 22 designates a ball member made of, for example, synthetic resin mounted to a bracket 150c projected at the back face of the reflector 14. Ball portion 23 of the ball member 22 is supported by a ball receive portion 24 integrally formed with an inner side of the lamp body 10 and these components thereby constitute the ball and socket joint 20. The ball receive portion 24 is formed in a cylindrical shape and vertical slits may be provided on a front end side of a cylindrical portion at equal intervals in the peripheral direction to thereby enable mounting and dismounting the ball portion 23 to and from the ball receive portion 24.

Notation 230 (240) designates a nut sliding guide having a dovetail groove structure integrally formed with the lamp body 10. Nut member 230 (240) screwed to the aiming screw 30 (40) can be operated to extract and retract in the front and rear direction by being carried and guided by the sliding guide 230 (240).

When the aiming screw 30 is pivoted, the left and right aiming point P1 constituting the mounting portion between the nut member 130 and the bracket 150*a*, is extracted and retracted along the screw portion 32 of the aiming screw, and the reflector 14 is inclined along a vertical inclining axis Ly connecting the aiming fulcrum P (ball and socket joint 20) and the upper and lower aiming point P2 constituting the mounting portion between the nut member 140 and the bracket 150*b*. Further, when the aiming screw 40 is pivoted, the upper and lower aiming point P2 constituting the mounting portion of the nut member 140 and the bracket 150*b*, is extracted and retracted along the screw portion 42 of the aiming screw and the reflector 14 is inclined around an inclining axis Lx connecting the aiming fulcrum P (ball and socket joint 20) and the left and right aiming point P1 constituting the mounting portion between the nut member 130 and the bracket 150*a*. That is, the aiming screw 30 constitutes a left and right aiming screw for adjusting to incline the optical axis of the lamp around the inclining axis Ly, and the aiming screw 40 constitutes an upper and lower aiming screw for adjusting to incline the optical axis of the lamp around the horizontal inclining axis Lx.

Next, a detailed explanation will be given of respective members constituting the aiming mechanism E.

Figure 5A:
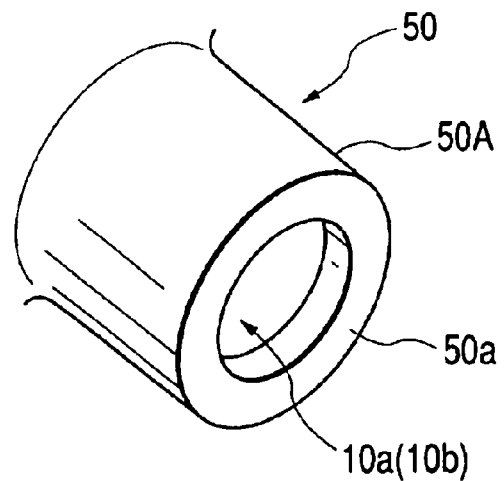
FIG. 5(a) is an enlarged perspective view of a cylindrical portion constituting a rotational support portion of an aiming screw.
Figure 5B:
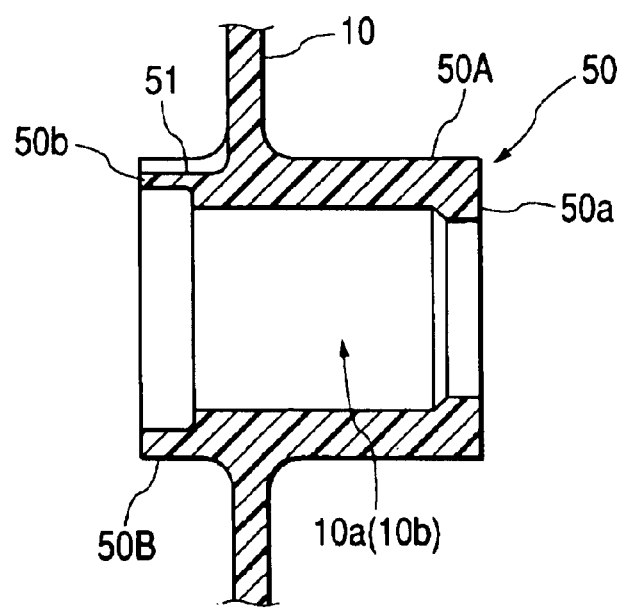
FIG. 5(b) is an enlarged vertical sectional view of the cylindrical portion.

As shown by FIGS. 5(*a*) and 5(*b*), screw insertion holes 10*a* and 10*b* are each constituted by a cylindrical portion 50 in a cylindrical shape formed integrally with the lamp body 10 and extended in the front and rear direction.

Figure 7:
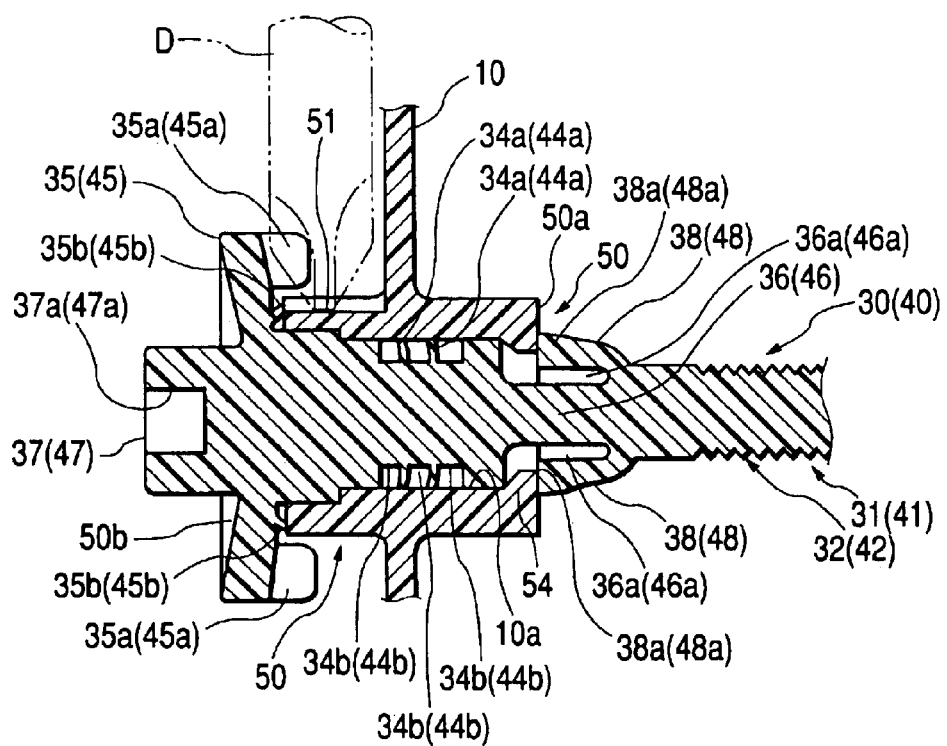
FIG. 7 is an enlarged vertical sectional view of the rotational support portion of the aiming screw.

A length of the cylindrical portion 50 in the front and rear direction is formed by a length rotatably supporting the aiming screw 30 (40) sufficiently for enabling the aiming screw 30 (40) to hold without play. Further, as shown by FIG. 7, an extended amount of a rear extended portion 50B is formed in a size capable of carrying a front end portion of a driver D for operating to pivot the aiming screw arranged along the lamp body 10. Further, an upper side face of the rear extended portion 50B is formed with a flat face 51 for positioning by constituting a state in which teeth of the driver D may become in mesh with teeth of a crowned gear when the front end portion of the driver D is brought into contact therewith. This arrangement is useful in preventing the front end portion of the driver D from sliding along an outer peripheral face of the cylindrical portion 50 when the driver D is pivoted.

Although the cylindrical portion 50 is integrally formed with the lamp body 10, since the shape is simple, the structure of dies and the shape of forming faces of the dies become simple and therefore, fabrication of the dies is simplified.

Figure 6A:
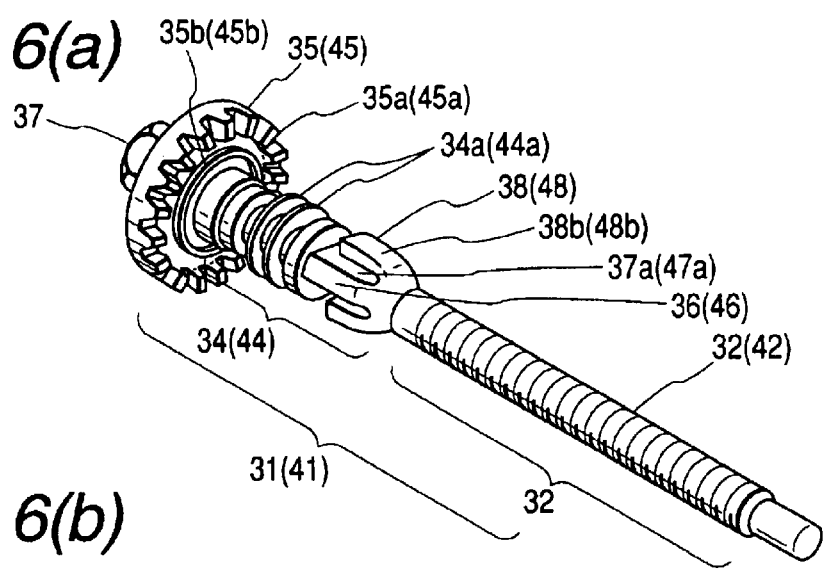
FIG. 6(a) is an enlarged perspective view of the aiming screw.

According to the aiming screw 30 (40), as shown by FIGS. 6 and 7, the screw main body 31 (41) formed with a male screw 32 (42) on a front end side and also formed with a crowned gear portion 35 (45) at a rear end, may be constituted by synthetic resin, such as, polyacetal resin or the like.

Notation 34 (44) designates a portion of the aiming screw 30 (40) supported by the cylindrical portion 50, referred to as the supported portion 34 (44). A rear end side of the supported portion 34 (44) is integrally formed with the crowned gear portion 35 (45) and a front end side of the supported portion 34 (44) is provided with an elastic locking piece 38 (48) for engaging with an end face (front end face of cylindrical portion) 50*a* of a front end portion in the shape of an inner flange of a front extended portion 50A.

As shown by FIGS. 6 and 7, the elastic locking pieces 38 (48) are formed in an L-like shape on both sides of a base portion 36 (46) having a cross-sectional face in a rectangular shape faced to be opposed to left and right side faces 36*a* (46*a*) on a front end side of the supported portion 34 (44) and horizontal extended portions rearward therefrom may be elastically deformed in the radial direction. The horizontal extended portion of the elastic locking piece 38 (48) is formed to be thicker towards a front end side thereof to thereby increase rigidity strength as a leaf spring and make engagement with the end face 50*a* of the cylindrical portion 50 difficult to disengage.

Further, an elastic rib 35*b* (45*b*), in a skirt-like shape that may be brought into sliding contact with a rear end face 50*b* of the cylindrical portion 50, is provided on a root side of the crowned gear 35 (45) on a rear end side of the supported portion in the aiming screw 30 (40). By bringing the elastic rib 35*b* (45*b*) into contact with the rear end face 50*b* of the cylindrical portion 50 and engaging the elastic locking piece 38 (48) on the front end side of the supported portion 34 (44) with the front end face 50*a* of the cylindrical portion 50, the aiming screw 30 (40) is fixedly positioned to the screw insertion hole 10*a* (10*b*) in the axial direction relative to the screw insertion hole 10*a* (10*b*). The elastic rib 35*b* (45*b*) is held by the rear end face 50*b* of the cylindrical portion 50 in a press-contact state, and elastically supports the aiming screw 30 (40) in the axial direction and holds the aiming screw 30 (40) such that there is no play between the aiming screw 30 (40) and the rotational support portion. Further, the elastic rib 35*b* (45*b*) also operates to ensure that the rotational support portion of the aiming screw 30 (40) is waterproof.

Teeth 35*a* (45*a*) of the crowned gear portion 35 (45) may be provided on the front side (side opposed to the lamp body), and as shown by FIG. 7, when the front end portion of the driver D used for pivoting the aiming screw is brought into contact with the flat face 51 of the cylindrical portion 50, the teeth of the driver D mesh with the teeth 35*a* (45*a*) of the crowned gear portion 35 (45) to thereby transmit rotational force on the side of the driver D to the side of the crowned gear portion 35 (45).

Additionally, a rear end portion (rear side of crowned gear portion 35 (45)) of the aiming screw 30 (40), may be integrally formed with a pivotally operating portion 37 (47) having an outer shape in a regular hexagonal shape in section and provided with a square groove 37*a* (47*a*) at its end face, and the aiming screw 30 (40) can also be operated to pivot by using a tool such as a spanner in place of the driver D.

Further, when the elastic rib 35*b* (45*b*) is made of synthetic resin, it is provided with pertinent elasticity (flexibility). Since the rear end face 50*b* of the cylindrical portion 50 made of synthetic resin is constituted by a smooth face, a sliding contact portion between the elastic rib 35*b* (45*b*) and the cylindrical rear end face 50*b*, does not hamper pivotal movement of the aiming screw 30 (40).

Additionally, the supported portion 34 (44) of the aiming screw, may be integrally formed with an elastic waterproof rib 34*a* (44*a*) in a ring-like shape brought into sliding contact with an inner peripheral face of the cylindrical portion 50 (screw insertion holes 10*a*, (10*b*)). In this case, an outer diameter of the waterproof rib 34*a* (44*a*) is formed to be slightly larger than an inner diameter of the screw insertion hole 10*a* (10*b*) and accordingly, the front-end portion of the waterproof rib 34a (44a) is always brought into press contact with the inner peripheral face of the screw insertion hole 10a (10b).

On both sides of the elastic waterproof rib 34a (44a) at the outer peripheral face of the supported portion 34 (44), there are formed ring-like grooves 34b (44b) extended along the waterproof rib 34a (44a), a gap between the supported portion 34 (44) of the aiming screw and the screw insertion hole 10a (10b) is not expanded, and an amount of projecting the elastic water proof rib 34a (44a) in the radial direction is increased to thereby promote elasticity (flexibility) of the elastic waterproof rib 34a (44a). Thereby, pertinent press-contact force is operated between the elastic waterproof rib 34a (44a) and the inner peripheral face of the screw insertion hole 10a (10b).

In other words, when the ring-like groove 34b (44b) is not provided, the amount of projecting (height in a radial direction) of the elastic waterproof rib is reduced by that amount, making the elasticity (flexibility) insufficient and therefore, excessive press-contact force is operated between the elastic waterproof rib and the inner peripheral face of the screw insertion hole. As such, pivotal torque of the aiming screw is increased and concerns are raised that the aiming screw may not pivot or be inserted into the screw insertion hole smoothly. Further, in order to increase elasticity (flexibility) of the elastic waterproof rib 34a (44a), the gap between the supported portion 34 (44) and the screw insertion hole 10a (10b) may be expanded and the amount of projecting the waterproof rib may be increased. However, as the gap is increased, waterproof performance is deteriorated and play at the rotational support portion is also increased and therefore, this constitution is not preferable.

Hence, according to the first embodiment, the ring-like groove 34b (44b) is formed along the root of the waterproof rib 34a (44a) and the gap between the supported portion 34 (44) and the inner peripheral face of the screw insertion hole 10a (10b) is not expanded. As such, the waterproof performance is not deteriorated, the amount of projecting of the elastic water rib 34a (44a) is increased, and press-contact force and sliding friction resistance produced between the elastic waterproof rib 34a (44a) and the screw insertion hole 10a (10b) are alleviated. Therefore, the aiming screw 30 (40) can be pivoted smoothly and inserted into the screw insertion hole 10a (10b) smoothly.

The waterproof ribs 34a (44a) may be provided at two locations in the axial direction in parallel and there may be constituted two stages of the sliding contact portions in the ring-like shape between the waterproof ribs 34a (44a) and the screw insertion hole 10a (10b) to thereby promote the waterproof performance at the rotational support portion of the aiming screw 30 (40).

Figure 6B:
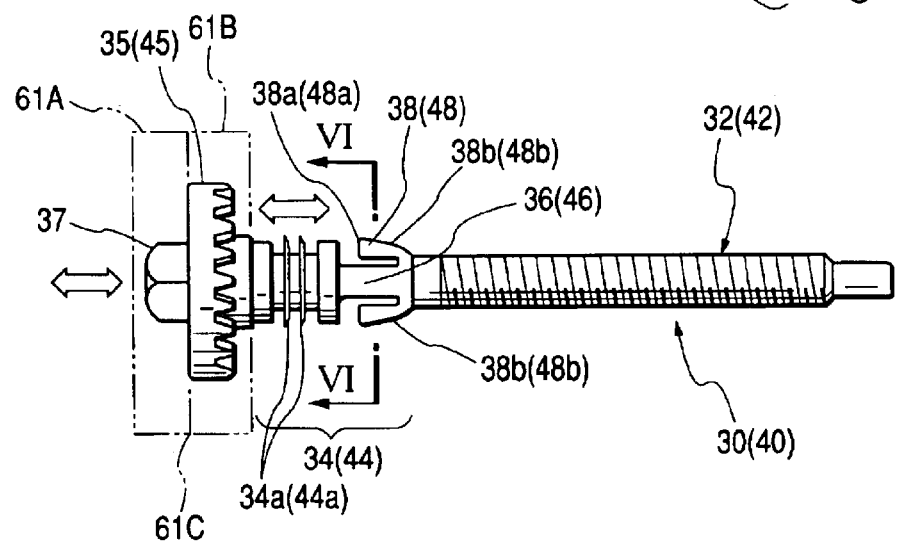
FIG. 6(b) is an enlarged side view of the aiming screw.
Figure 6C:
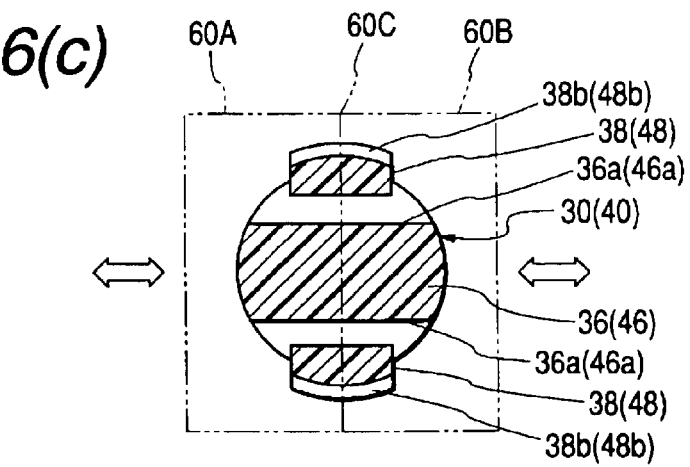
FIG. 6(c) is a cross-sectional view (sectional view taken along a line VI—VI shown in FIG. 6(b) of the aiming screw.

In addition, there can be respectively injection-molded a portion of the aiming screw 30 (40) forward from the supported portion 34 (44), by using a pair of divided dies 60A and 60B divided in the radial direction as shown by white arrow marks of FIG. 6(c), and the crowned gear portion 35 (45) of the aiming screw 30 (40) by using a pair of divided dies 61A and the 61B as shown by a white arrow mark of FIG. 6(b). Notations 60C and 61C in FIGS. 6(b) and 6(c) designate parting lines of the divided dies.

Next, an explanation will be given of a method of integrating the aiming screws 30 and 40 to the cylindrical portions 50 (screw insertion holes 10a, 10b) of the lamp body 10.

First, the aiming screw 30 (40) is pushed from a rear side of the lamp body 10 into the screw insertion hole 10a (10b).

Figure 8:
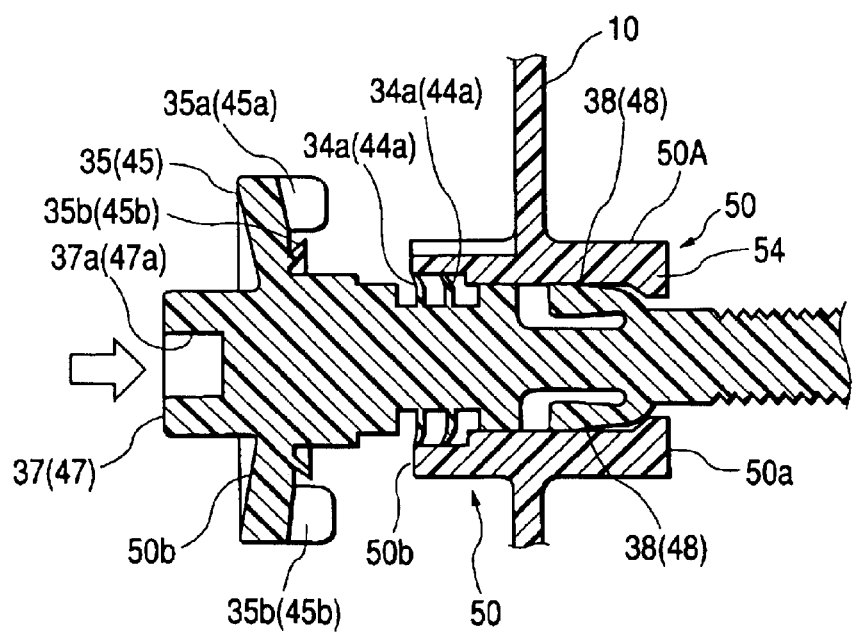
FIG. 8 is an explanatory view for explaining a behavior of inserting the aiming screw into a screw insertion hole.
Figure 9:
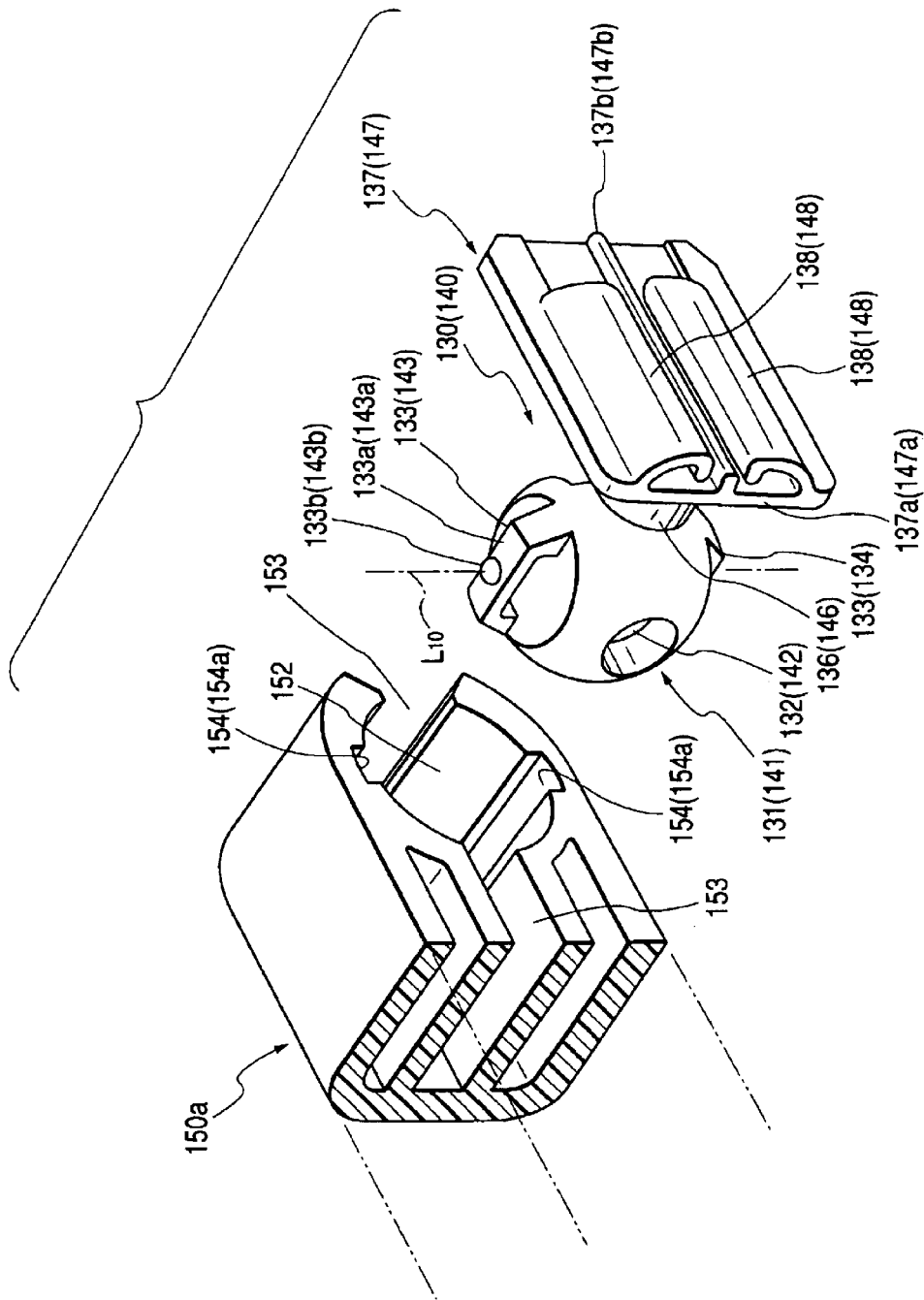
FIG. 9 is a disassembled perspective view between mounting portions of a nut member and a bracket.
Figure 10A:
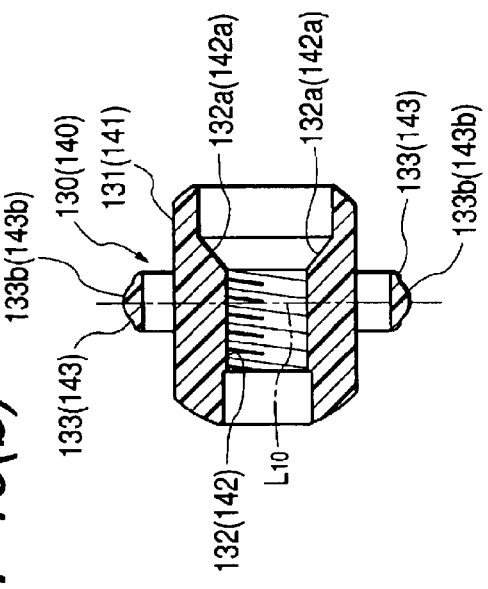
FIG. 10(a) is a front view of the nut member.
Figure 10B:
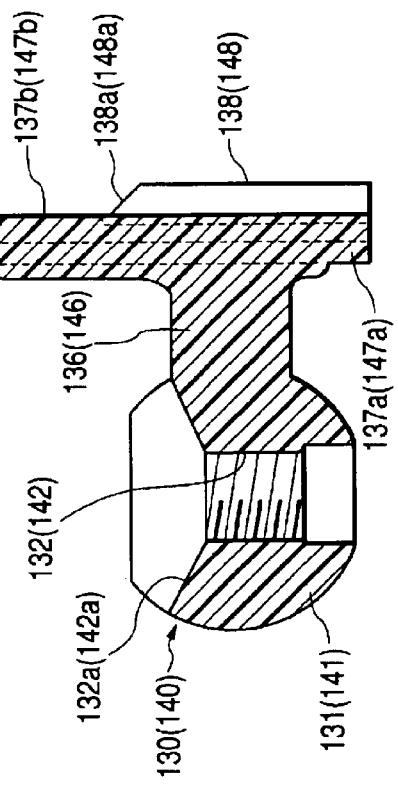
FIG. 10(b) is a vertical sectional view of the nut member.
Figure 10C:
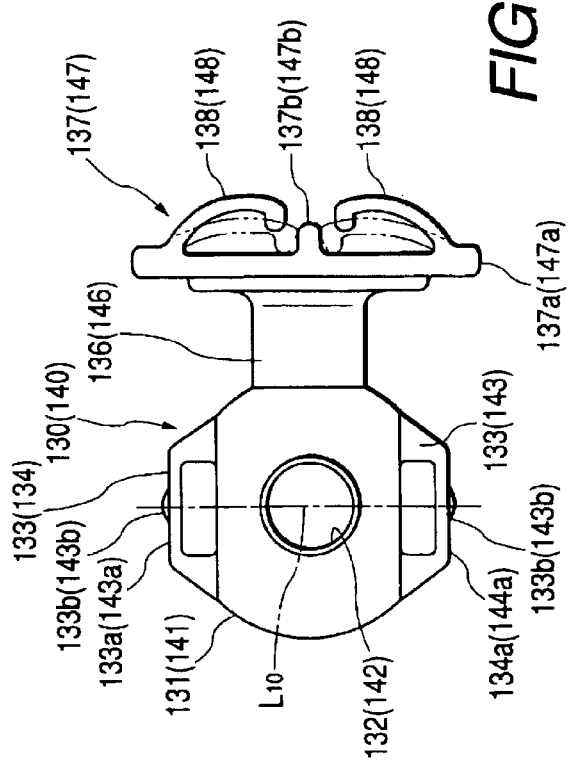
FIG. 10(c) is a horizontal sectional view of the nut member.

The male screw portion 32 (42) having an outer diameter smaller than a hole diameter of the screw insertion hole 10a (10b), is smoothly inserted into the screw insertion hole 10a (10b). According to the supported portion 34 (44) of the aiming screw 30 (40), a distance between the pair of elastic locking pieces 38 (48) at the front end side, is larger than the screw insertion hole 10a (10b) and therefore, the elastic locking pieces 38 (48) are brought into contact with the rear end face 50b of the cylindrical portion 50, and the insertion is hampered temporarily. However, when the aiming screw 30 (40) is pushed into the screw insertion hole 10a (10b) against a reaction force operated to the elastic locking pieces 38 (48), as shown by FIG. 8, the elastic locking pieces 38 (48) are elastically deformed to contract to inner sides in the radial direction by being pushed by the rear end face 50b of the rear end side cylindrical portion 50B and the inner peripheral face of the screw insertion hole 10a (10b) and slid into the cylindrical portion 50. Further, in a mode in which the supported portion 34 (44) is pushed into the screw insertion hole 10a (10b) by a force equal to or larger than the spring force which the skirt-like elastic rib 35b (45b) receives from the rear end face 50b of the cylindrical portion 50B and the front end portions 38a (48a) of the elastic locking pieces 38 (48), the elastic locking pieces 38 (48) pass through the screw insertion hole 10a (10b) and recover to the outer side in the radial direction to engage with the cylindrical portion front end face 50a. Accordingly, the aiming screw 30 (40) is prevented from drawing to the rear side and the skirt-like elastic rib 35b (45b) on the rear end side of the supported portion 34 (44) is brought into a state in press contact with the cylindrical portion rear end face 50b. As such, the aiming screw 30 (40) is fixedly positioned to the screw insertion hole 10a (10b) in the axial direction.

The elastic locking piece 38 (48) may be formed in a shape of a tongue piece having a comparatively thin thickness and provided with a small modulus of section as a leaf spring and therefore, the elastic locking piece is liable to elastically deform to the inner side in the radial direction. In addition, the elastic locking piece 38 (48) may be provided with a vertical section in an L-like shape and formed to be thick-walled toward the front end side of the horizontal extended portion, as shown by FIG. 6(c) wherein an outer peripheral face 38b (48b) of the elastic locking piece 38 (48) is formed in a shape of a circular arc in its cross-sectional face following an inner peripheral face of the screw insertion hole 10a (10b) and is formed in a converging shape toward its base end portion side. Therefore, when the supported portion 34 (44) is inserted into the screw insertion hole 10a (10b), the outer peripheral face 38b (48b) of the elastic locking piece 38 (48) is brought into contact with a peripheral edge portion of the screw insertion hole 10a (10b) and the elastic locking piece 38 (48) is smoothly deformed elastically to the inner side in the radial direction, and is smoothly inserted into the screw insertion hole 10a (10b), slid, and advanced.

Also, since the front end portion of the elastic locking piece 38 (48) may be thick-walled, an area of the elastic locking piece 38 (48) engaging with the cylindrical portion front end face 50a is large and accordingly, the elastic locking piece 38 (48) is difficult to detach from the cylindrical portion front end face 50a.

Next, an explanation will be given of respective structures of the nut member 130 (140) screwed to the aiming screw 30 (40), an engaging hole 152 on a side of the bracket 150a (150b) mounted with the nut member 130 (140), and the nut sliding guide 230 (240) for carrying and supporting slidably the nut member 130 (140).

As shown by FIGS. 1 through 4, 13 and 14, the nut sliding guide 230 (240) may be formed in the shape of a rectangular frame extended in the front and rear direction at a position at a vicinity of a lamp body wall face on a side (lower side) of the left and right (upper and lower) aiming screw 30 (40), and has a dovetail groove 232 (242) having a wide width, in which a side face thereof opposed to the aiming screw 30 (40) is opened. Notation 231 (241) designates an opening portion of the dovetail groove 232 (242). Further, the nut sliding guide 230 (240) may be integrally formed with the wall face of the lamp body 10 to thereby ensure strength as the nut sliding guide. Also, the nut sliding guide 230 may be provided at a right upper corner in front view of the lamp body 10 at a left lower corner in front view of the lamp body 10.

As shown by FIGS. 1 through 4, 9, 10, and 13 through 16, the nut member 130 (140) may be constituted in a mode in which a slider portion 137 (147) is integrally formed, via a shaft portion 136 (146), to a side of a substantially spherical nut member main body 131 (141) formed with a female screw portion 132 (142) screwed to the aiming screw 30 (40) and the spherical nut member main body 131 (141) may be projected from a substantially central portion of the slider portion 137 (147) in the shape of a rectangular plate.

The nut member main body 131 (141), constituting the left and right aiming point P1 (upper and lower aiming point P2), is supported by a nut engaging hole 152 formed in the bracket 150a (150b), explained later in details, and constitutes a mounting portion between the bracket 150a (150b) and the nut member 130 (140) having a universal joint structure.

The slider portion 137 (147) may be constituted by a slide plate 137a (148) in a rectangular shape and a pair of left and right elastic extended pieces 138 (148) in a shape of a leaf spring formed on a bottom face side thereof. The elastic extended piece 138 (148) may be bent in the shape of a circular arc in its section and extended from an outer side to an inner side of the width direction of the slide plate 137a (147a). Also, a vertical rib 137b (147b), extended in the front and rear direction, may be formed at a central portion in the width direction of the slide plates 137a (147a) when the slider portion 137 (147) is integrated to the nut sliding guide 230 (240), as shown by imaginary lines in FIG. 10(a), and front end portions of the elastically-deformed pair of left and right elastic extended pieces 138 (148) may be brought into contact with the vertical rib 137b (147b). That is, in a mode in which the slider portion 137 (147) is engaged with the dovetail groove 232 (242) of the nut sliding guide 230 (240), the front end portions of the elastic extended pieces 138 (148), which are brought into press contact with an inner wall face 234 (244), are brought into contact with both sides of the vertical rib 137b (147b). As such, the elastic extended piece 138 (148) forms an arch, and the slider portion 137 (147) is supported by the nut sliding guide 230 (240) without play in the up and down and left and right directions and is held slidably in the front and rear direction constituting a direction of extending the nut sliding guide 230 (240).

Further, as shown by notation 138a (148a), a side edge of the elastic extended piece 138 (148) on the side of the rear face of the slider portion 137 (147), may be formed in a skewedly cut shape to thereby facilitate inserting the slider portion 137 (147) into the nut sliding guide 230 (240).

The weight of the reflector 14 is naturally carried by the ball and socket joint 20, constituting the aiming fulcrum P, and by carrying the slider portion 137 of the nut member 130 by the nut sliding guide 230, the weight of the reflector 14 is supported, the nut member 130 is positioned in the up and down direction, and fluctuation of the aiming screw 30 in the up and down direction (vibration of the reflector 14 in the up and down direction) is restrained.

In addition, the nut sliding guide 240 may position and hold the slider portion 147 of the nut member 140 in the left and right direction and restrain fluctuation of the aiming screw 40 in the left and right direction (vibration of the reflector 12 in the left and right direction). Further, the weight of the reflector 14 is supported by the ball and socket joint 20 constituting the aiming fulcrum P and the sliding guide 230 of the nut member 130 and therefore, the weight of the reflector 14 does not affect operating the aiming screw 30 via the nut member 130.

Naturally, the nut member main body 141 projected upward from the slider portion 147 integrated to the sliding guide 240, and the nut engaging hole 152 opened to the lower side of the bracket 150b, are slidably engaged in the up and down direction and therefore, the weight of the reflector 14 does not affect operation of the aiming screw 40.

In this way, the reflector 14 is supported without play in the up and down and left and right directions and inclined smoothly in cooperation with pivotal movement of the aiming screw 30 (40).

Further, for example, according to a mounting structure between bracket and nut members in which an engaging projection constituting a ball portion is provided at a side of a nut member main body and the engaging projection constituting the ball portion is engaged with an engaging hole constituting a ball receive portion provided at the bracket, there is a concern that weight load on the side of a reflector is operated to the nut member as torsional moment to thereby amount to vibration of the reflector. However, according to the present invention, there is constructed a structure in which the nut member main body 131 (141), per se, constitutes the ball portion of the universal joint and is supported by the engaging hole 152 constituting the ball receive portion and therefore, there is not such a drawback. That is, inertia weight load on the side of the reflector 14 is operated to an axis center position of the aiming screw 30 (40) screwed to the female screw portion 132 (142) of the nut member main body 131 (141) and therefore, the weight load on the side of the reflector 14 is not operated to the nut member as torsional moment and accordingly, the reflector 14 is not vibrated in the up and down and left and right directions.

Next, on the rear face side of the nut member main body 131 (141), there is formed an opening portion 132a (142a) in a converging taper shape at the female screw portion 132 (142) to facilitate screwing the aiming screw 30 (40) to the female screw portion.

Moreover, at upper and lower faced side faces of the nut member main body 131 (141), there may be respectively formed elastic engaging frames 133 (143) in a gate shape constituting elastic projections orthogonally riding over the female screw portion 132 (142). At horizontal beam portions 133a (143a) of the upper and lower elastic engaging frames 133 (143), there may be provided very small projections 133b (143b) having spherical front end faces to sandwich a central axis of the female screw portion 132 (142).

Figure 13:
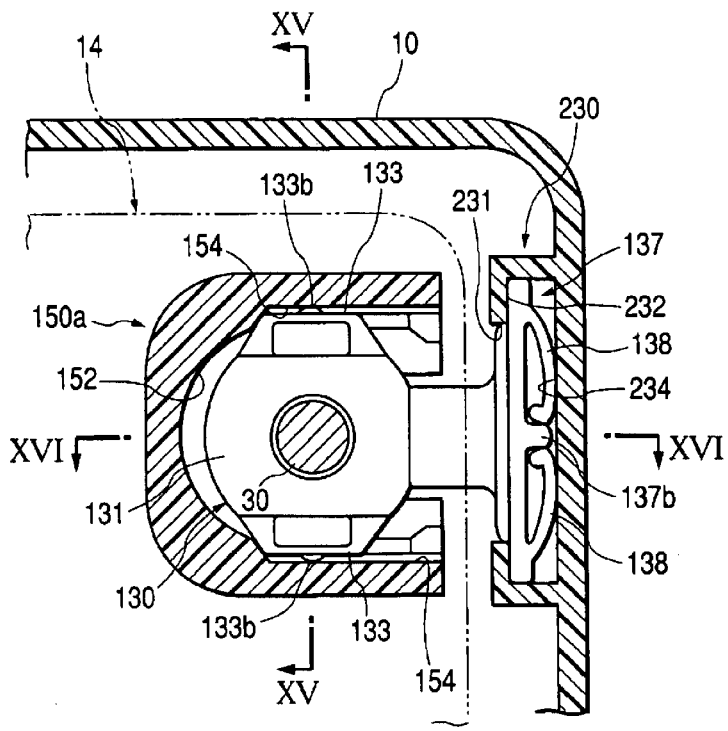
FIG. 13 is a sectional view of a mounting portion between the nut member and the bracket constituting a left and right aiming point.
Figure 14:
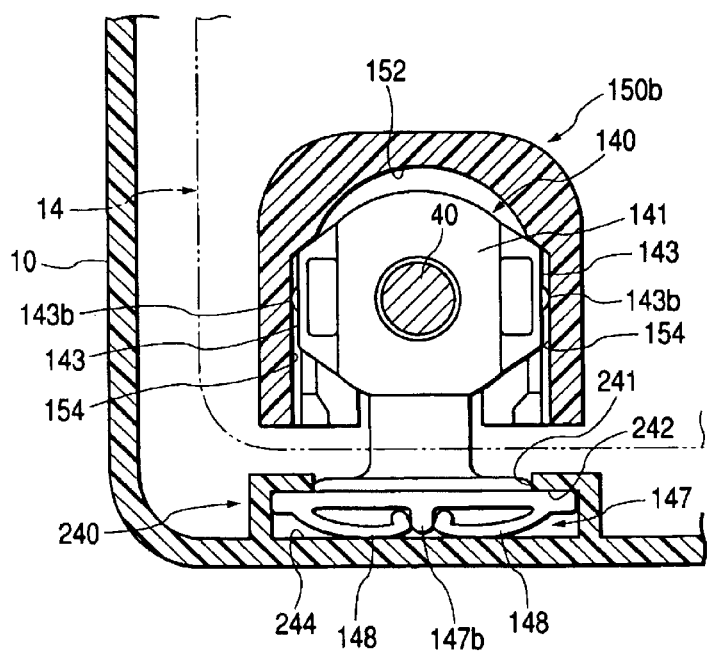
FIG. 14 is a sectional view of a mounting portion between the nut member and the bracket constituting an upper and lower aiming point.

The nut engaging hole 152 provided at the front end portion of the bracket 150a (150b) may be formed in a shape of a circular cylinder in its section matching with the substantially spherical nut member main body 131 (141). Further, at the bracket 150a, as shown by FIG. 13, the nut member main body 131 may be engaged from a side to the hole 152 opened to an outer side in the left and right direction of the reflector 14 and at the bracket 150b. As shown by FIG. 14, the nut member main body 141 can be engaged from a lower side to the hole 152 opened to the lower side of the reflector 14.

Figure 11:
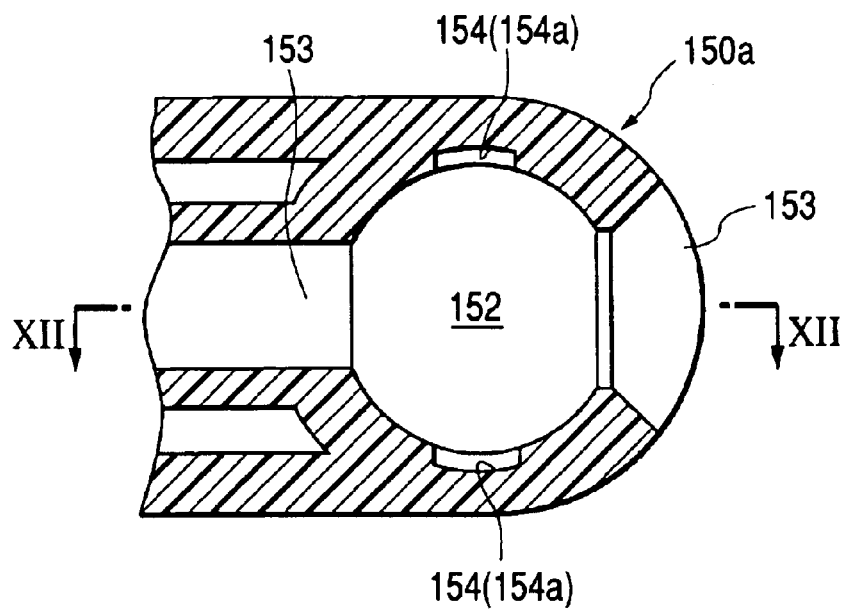
FIG. 11 is a front view of a nut engaging hole on a side of the bracket.
Figure 12:
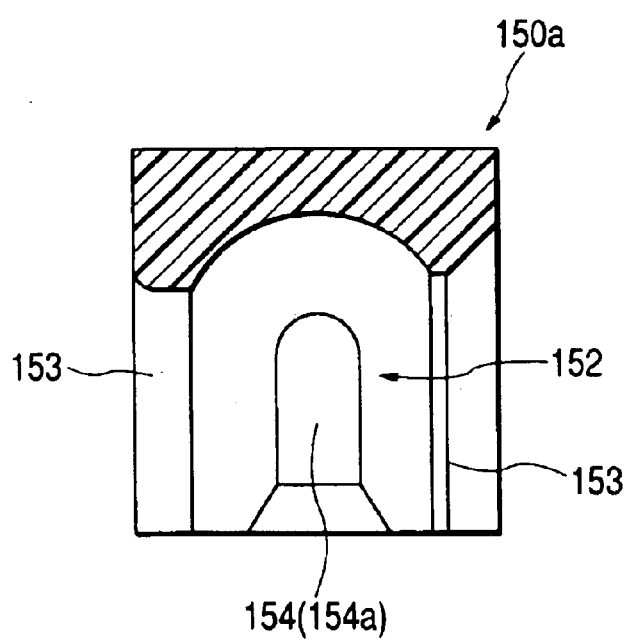
FIG. 12 is a horizontal sectional view (sectional view taken along a line XII—XII shown in FIG. 11) of the nut engaging hole.

That is, at opposed positions of an inner peripheral face of the engaging hole 152, as shown by FIGS. 11 and 12, engaging grooves 154 in correspondence with the horizontal beam portions 133a (143a) of the elastic engaging frame 133 (143) in the gate shape, may be extended in a direction of extending the hole 152. Further, at opposed positions forward and rearward from a peripheral wall of the engaging hole 152 in the bracket 150a (150b), slits 153 may be provided for inserting the aiming screw 30 (40) and a peripheral area of the engaging hole 152 may be formed in a U-like shape in its vertical section (refer to FIGS. 13, 14).

In addition, the elastic engaging frame 133 (143) and the engaging groove 154 may be brought into press contact with each other in the radial direction of the engaging hole 152 and loosely fitted to each other in the peripheral direction of the engaging hole 152 (groove width direction of groove 154), and the nut member main body 131 (141) and the engaging hole 152 are slidable relative to each other in the direction of extending the engaging hole 152 and pivotable relative to each other in the peripheral direction of the engaging hole 152.

A detailed description will now be given of this feature. The width of the elastic engaging frame 133 (143) may be formed to be narrower than the groove width of the engaging groove 154. Therefore, the elastic engaging frame 133 (143) can be slid along the engaging groove 154 while the horizontal beam portion 133a (143a) is being brought into press contact with a bottom face 154a of the engaging groove 154. Further, gaps 155 may be formed between the elastic engaging frame 133 (143) and the engaging groove 154, and the nut member main body 131 (141) and the engaging hole 152 can be pivoted relative to each other in the peripheral direction of the engaging hole 152 by an amount corresponding with the gap 155. Further, the elastic engaging frame 133 (143) may be held in a mode in which the horizontal beam portion 133a (143a) is brought into press contact with the bottom face 154a of the engaging groove 154 and therefore, there is not play between the nut member main body 131 (141) and the engaging hole 152.

Figure 15:
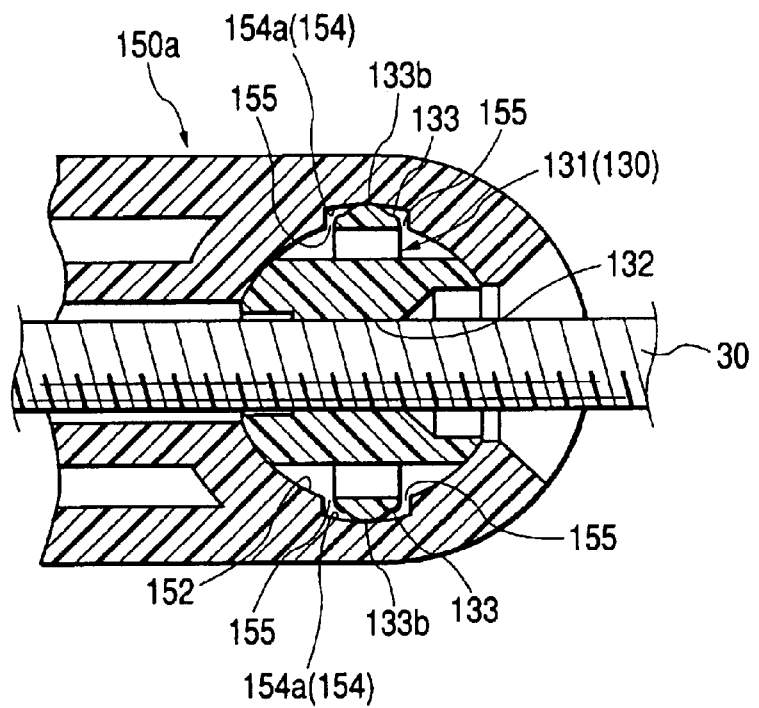
FIG. 15 is a sectional view (sectional view taken along a line XV—XV shown in FIG. 13) of a mode in which the nut member is engaged with the nut engaging hole.
Figure 16:
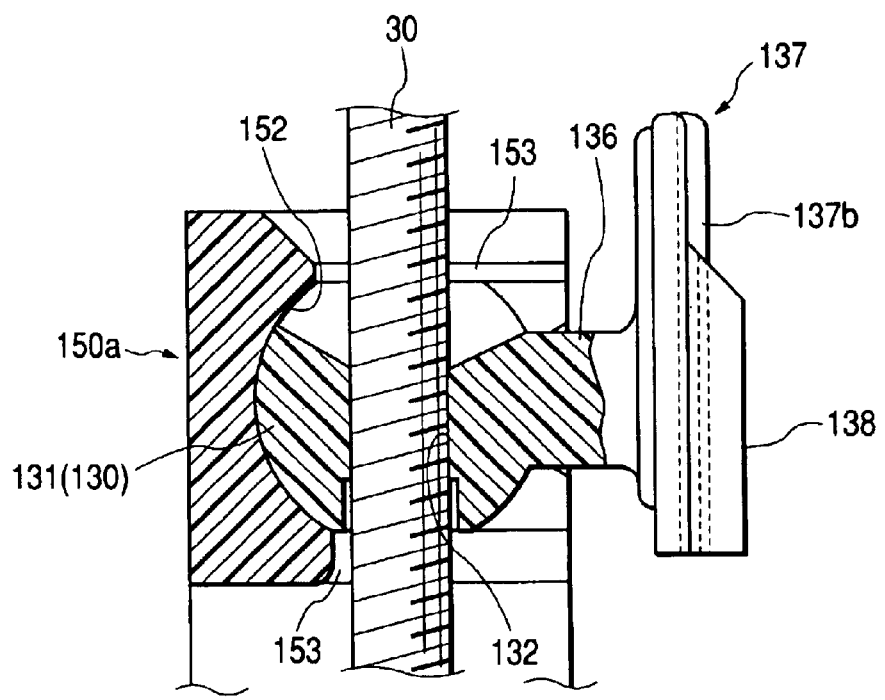
FIG. 16 is a sectional view (sectional view taken along a line XVI—XVI shown in FIG. 13) of the mode in which the nut member is engaged with the nut engaging hole.

Also, the bottom face 154a of the engaging groove 154 may be formed in a shape of a circular arc matching with an inner peripheral face of the nut hole 52, and a front end face of the very small projection 133b (143b) may be formed in a spherical shape. In addition, as shown by FIG. 15, an outer side surface of the horizontal beam portion 133a (143a) of the elastic engaging frame 133 may also be formed in the shape of a circular arc. Thereby, there is constructed a constitution in which sliding performance between the horizontal beam portion 133a (143a) and the engaging groove bottom face 154a in a press-contact state is promoted, and a relative pivoting amount of the elastic engaging frame 133 relative to the engaging groove 154 (relative pivoting amount in the peripheral direction of the engaging hole 152 between the nut member 130 (140) and the bracket 150a (150b)) is provided by a large amount.

In this way, the engaging hole 152 and the nut member main body 131 (141) may be constructed by the universal joint structure in which the engaging hole 152 and the nut member main body 131 (141) are relatively slidable in the direction of extending the engaging hole 152, relatively pivotable around the horizontal inclining axis Lx and relatively pivotable around an axis L10 (refer to FIGS. 9, 10) passing through the upper and lower very small projections 133b (143b).

Figure 17:
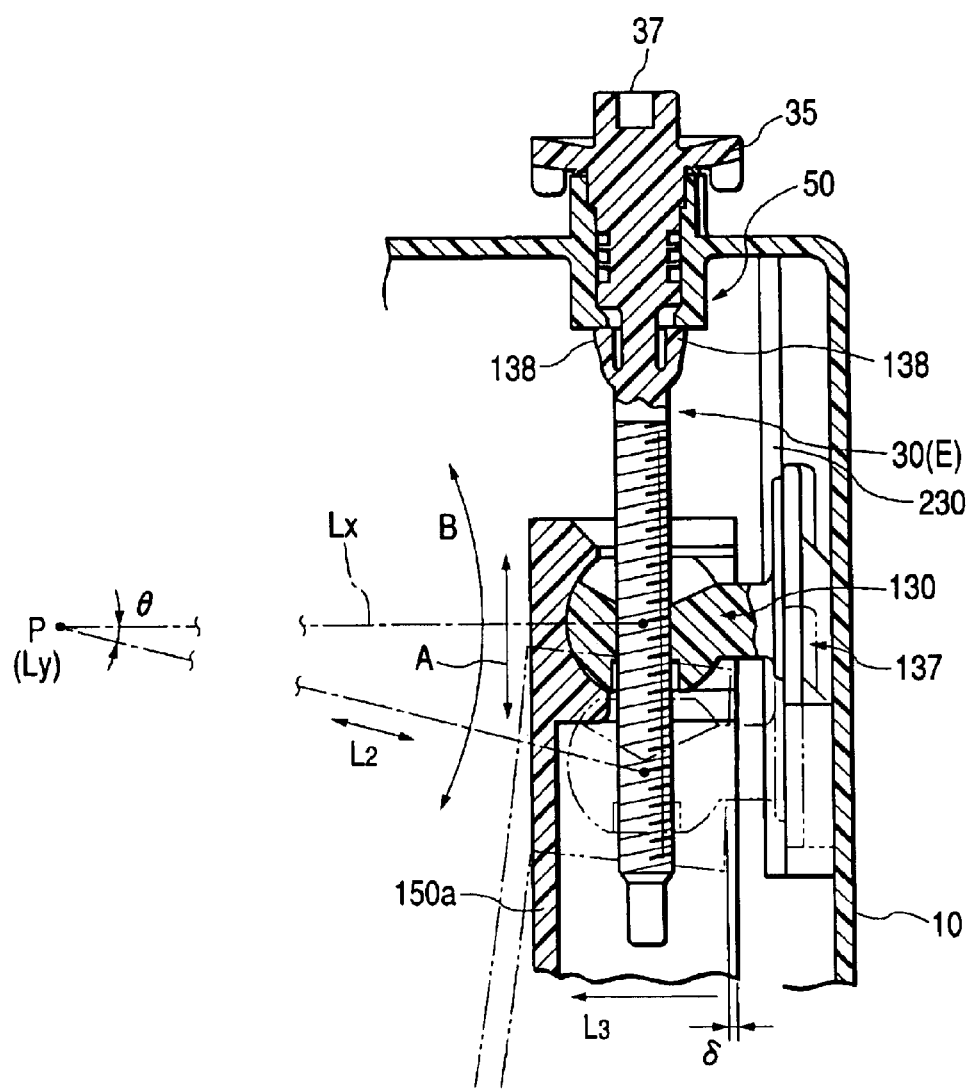
FIG. 17 is an explanatory view for explaining stress relieving operation at the mounting portion between the nut member and the bracket constituting the aiming point.

That is, for example, as shown by FIG. 17, in accordance with pivotal movement of the aiming screw 30, as shown by an arrow mark A, the nut member 130 may be extracted and retracted along the screw 30 (linear movement); meanwhile, the engaging hole 152 of the bracket 150a of the reflector 14 may be rotated (inclined) around the aiming fulcrum P (vertical inclining axis Ly) as shown by an arrow mark B. Therefore, at an engaging portion (the nut portion main body 131 and the engaging hole 152) between two members (the nut member 130 executing linear movement and the bracket 150a executing rotational movement) having different movement loci, a stress is produced in correspondence with a difference (deviation) between the movement loci.

However, in accordance with the extracting and retracting operation along the screw 30 of the nut member 130, the nut member main body 131 and the engaging hole 152 on the side of the bracket 150a are slid relative to each other in an engaging direction (direction of extending the engaging hole 152) and tensile stress (compressive stress) is relieved in correspondence with a deviation in a direction along the horizontal inclining axis Lx passing through the aiming fulcrum P at the mounting portion between the nut member 130 and the bracket 150a.

Further, the nut member main body 131 and the engaging hole 152 may be pivoted relative to each other in the horizontal direction (relative pivotal movement around is the axis L10 of FIGS. 9, 10) to thereby relieve torque in correspondence with an angular deviation between the direction L2 of extending the engaging hole 152 and a direction L3 of projecting the nut member main body 131. That is, stress is relieved at the mounting portion when the reflector 14 is inclined around the vertical inclining axis Ly passing through the aiming fulcrum P.

In addition, stress is relieved at the mounting portion between the nut member 130 and the bracket 150a when the nut member main body 131 and the engaging hole 152 are pivoted relative to each other in the peripheral direction of the engaging hole 152 and the reflector 14 is inclined around the horizontal inclining axis Lx passing through the aiming fulcrum P.

Also, when the reflector 14 is thermally expanded because of heat generation by the light source, at the mounting portion between the nut member 130 and the bracket 150a, there is going to be produced stress accompanied by deformation of the reflector 14. However, this stress is relieved by the universal joint structure constituted by the nut member main body 131 and the engaging hole 152.

In addition, also at the mounting portion between the nut member 140 and the bracket 150b, similarly, there is relieved stress which is going to be produced at the mounting portion, by the universal joint structure constituted by the nut member main body 141 and the engaging hole 152.

Next, an explanation will be given of a procedure of integrating the reflector 14 to the lamp body 10 via the aiming mechanism. First, the lamp body 10 integrated with the aiming screws 30 and 40 is directed upwardly. Next, the ball member 22 is attached to the bracket 150c and the nut member main bodies 131 and 141 of the nut members 130 and 140 are respectively engaged with the engaging holes 152 of the brackets 150a and 150b. Further, the brackets 150a, 150b and 150c are directed downwardly, the reflector 14 is lowered from the upper side of the lamp body 10, and the female screw portions 132 (142) of the nut members 130 and 140 are positioned to front ends of the aiming screws 30 and 40. By pivoting the aiming screws 30 and 40, the female screw portions 132 (142) of the nut members 130 and 140 are respectively screwed to the aiming screws 30 and 40, the slider portions 137 (147) are inserted into the nut sliding guides 230 and 240 further, and the ball portion 23 of the ball member 22 is press-fitted to the ball receive portions 24 integrally formed with the lamp body 10. Thereby, the reflector 14 can be integrated to the lamp body 10 via the aiming mechanism E.

Figure 18:
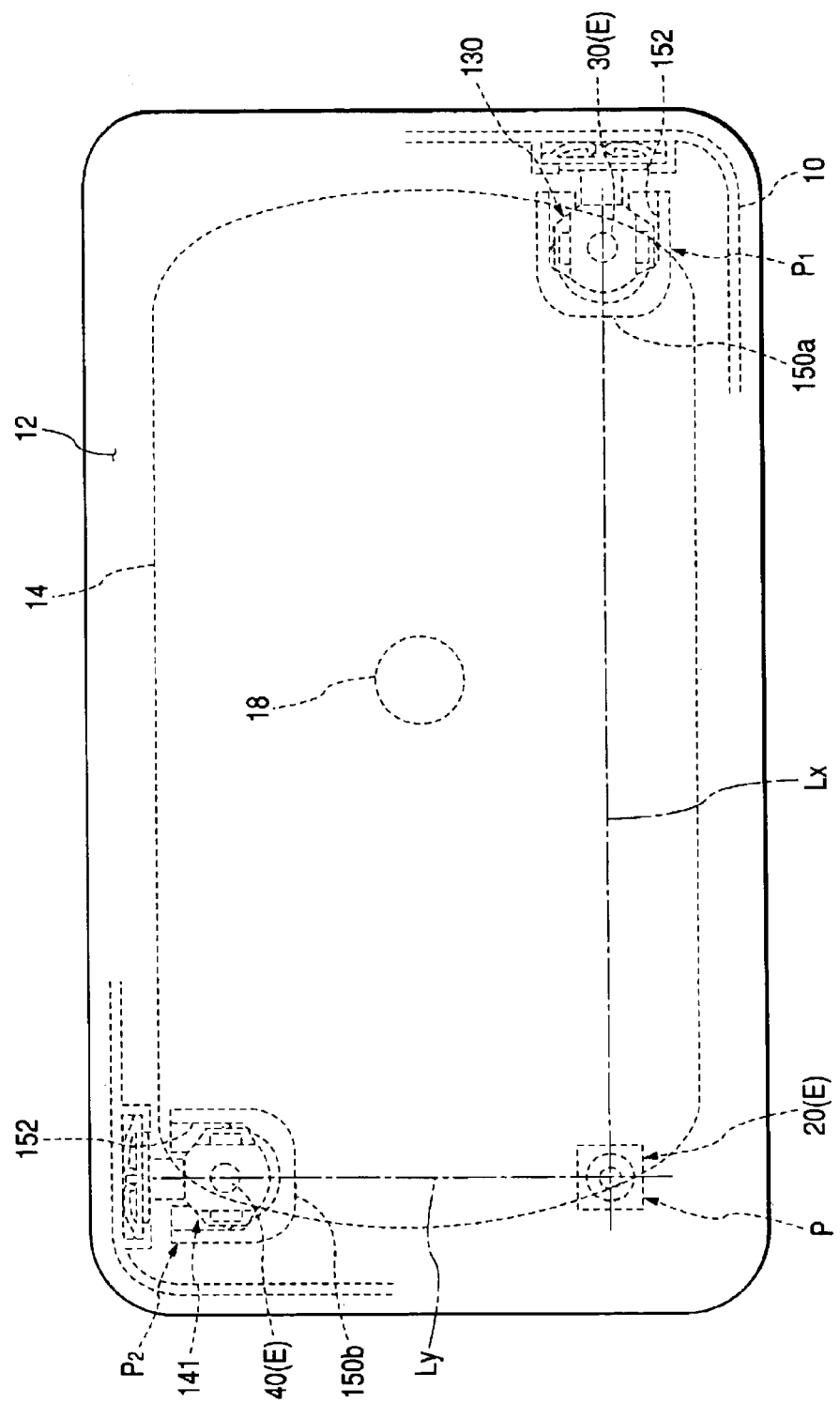
FIG. 18 is a front view of a headlamp for an automobile according to a second embodiment of the invention.
Figure 19:
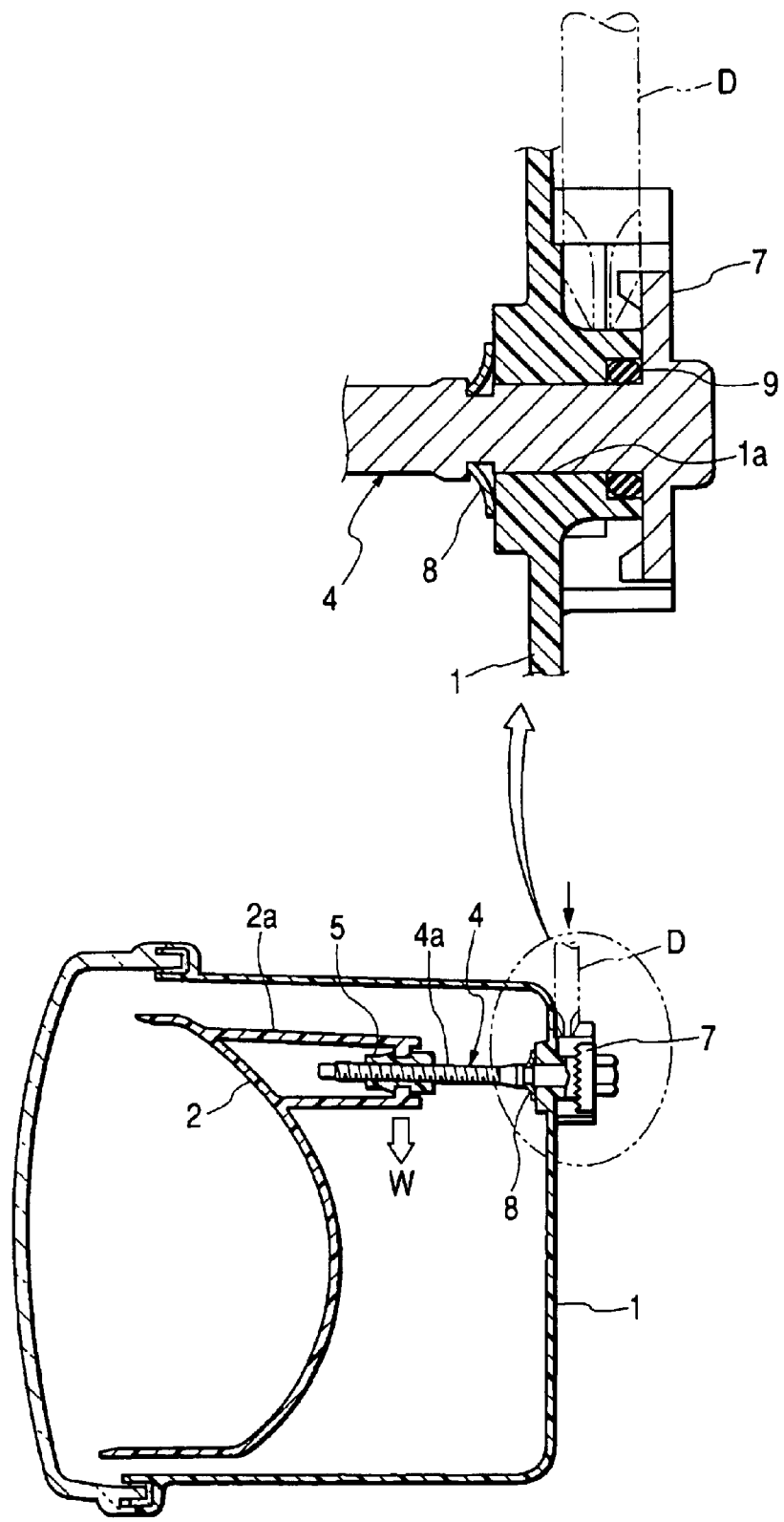
FIG. 19 is a sectional view of a surrounding of a rotational support portion of a conventional aiming screw.
Figure 20:
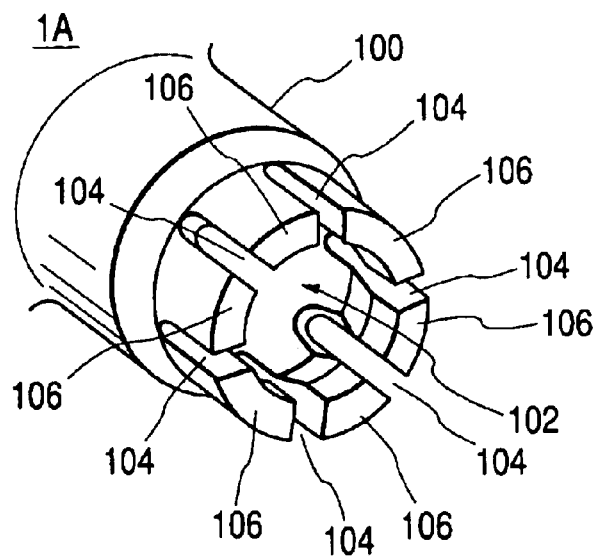
FIG. 20 is a perspective view of a screw insertion hole in a headlamp for an automobile according to preceding application.
Figure 21:
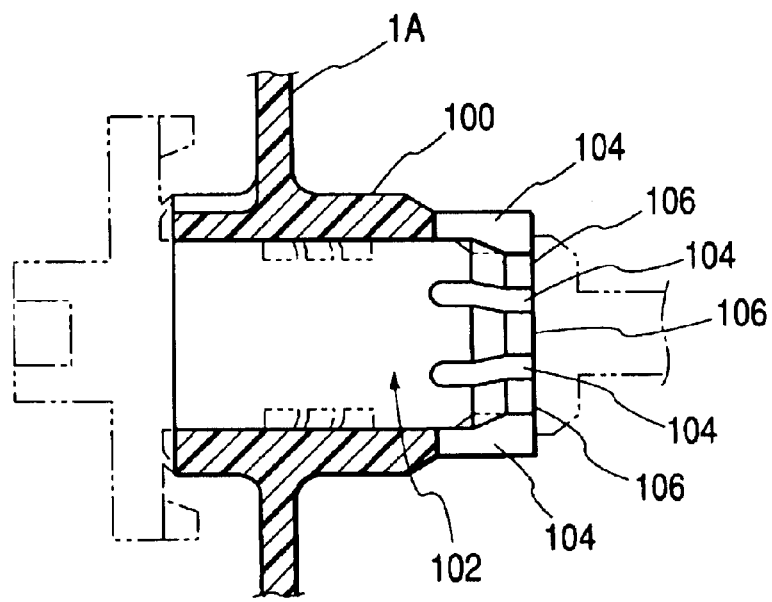
FIG. 21 is a sectional view at a surrounding of the screw insertion hole.

FIG. 18 is a front view of a headlamp according to a second embodiment of the invention.

Although according to the above-described first embodiment, an explanation has been given of the headlamp having the aiming mechanism in which the aiming fulcrum P is arranged at the left upper corner, according to the second embodiment, there is constructed a structure having an aiming mechanism in which the aiming fulcrum P is arranged at a left lower corner of the reflector 14, the left and right aiming point P1 is provided at a right lower corner, and the upper and lower aiming point P2 is provided at a left upper corner, respectively.

Since the configuration and operation of the second embodiment are similar to that of the first embodiment, a duplicated explanation thereof will be omitted. Of course, other arrangements of the aiming mechanism in relation to the headlamp may be employed.

Further, although according to the above-described embodiments, the lamp body 10 may be constituted by polypropylene resin, and the aiming screws 30 and 40 may be constituted by polyacetal resin provided with pertinent elasticity, excellent in wear resistance, and having excellent slidability with polypropylene resin, the aiming screws 30 and 40 may be constituted by nylon resin in place of polyacetal resin. Further, although the elastic rib 35b (45b) is formed in the skirt-like shape, there may be constructed a constitution in which elastic ribs are extended not in the skirt-like shape but in a radial shape at a plurality of locations at equal intervals in the peripheral direction.

In addition, although according to the above-described embodiments, an explanation has been given such that the aiming screws 30 and 40 are made of synthetic resin, at least the supported portion 34 (44) may be made of synthetic resin and the other portion may be made of metal. Further, there may be constructed a structure in which the aiming screws 30 and 40 are made of metal publicly-known conventionally and a pinching force of the aiming screw 30 or 40 by a push-on fix is weakened to thereby promote pivotal operability of the aiming screw 30 or 40.

What is claimed is:

1. A reflector movable type headlamp for an automobile, comprising:
   a lamp body;
   a light source;
   a reflector positioned to reflect light originating from the light source; and
   an aiming mechanism interposed between the lamp body and the reflector and operable to inclinably support and move the reflector relative to the lamp body;
   wherein the aiming mechanism includes:
   a screw insertion hole provided to the lamp body and including a cylindrical portion; and
   an aiming screw operable to move the reflector by pivoting the aiming screw, the aiming screw including a supported portion supported by the screw insertion hole, a male screw portion forward from the supported portion, and a pivotal movement operating force transmitted portion rearward from the supported portion,
   wherein a front end side of the supported portion includes an elastic locking portion operable to pass through the screw insertion hole by being deformed elastically to an inner side in a radial direction, and a rear end side of the supported portion is integrally formed with an elastic rib brought into press contact with a peripheral edge portion on a rear end side of the screw insertion hole to fixedly position the aiming screw.

2. The reflector movable type headlamp according to claim 1, wherein the elastic locking portion of the supported portion engages with a peripheral edge portion on a front end side of the screw insertion hole to prevent the aiming screw from drawing in a rear direction.

3. The reflector movable type headlamp according to claim 1, wherein at least the supported portion of the aiming screw is formed of synthetic resin.

4. The reflector movable type headlamp according to claim 1, wherein the cylindrical portion is formed of synthetic resin.

5. The reflector movable type headlamp according to claim 1, wherein the lamp body has a vessel shape.

6. The reflector movable type headlamp according to claim 1, wherein the screw insertion hole is formed integrally with the lamp body and extended in a front direction thereof.

7. The reflector movable type headlamp according to claim 1, wherein the elastic locking portion includes locking pieces in a shape of a tongue piece provided at a plurality of locations at equal intervals in a peripheral direction of the supported portion and extended in a rear direction thereof.

8. The reflector movable type headlamp according to claim 1, wherein the elastic rib is formed in a skirt-like shape.

9. The reflector movable type headlamp according to claim 1, wherein the pivotal movement operating force transmitted portion includes a crowned gear directing teeth in a front direction thereof, the screw insertion hole is constituted by the cylindrical portion penetrating the lamp body and extended on both sides of the lamp body, and an outer peripheral face of a rear extended portion of the cylindrical portion is provided with a tool positioning contact portion for positioning a tool for pivoting the crowned gear.

10. The reflector movable type headlamp according to claim 1, wherein an outer peripheral face of the supported portion is integrally formed with an elastic waterproof rib in a ring-like shape operable to be brought into sliding contact with an inner peripheral face of the screw insertion hole.

11. The reflector movable type headlamp according to claim 1, wherein a whole of the aiming screw is integrally formed with synthetic resin.

12. The reflector movable type headlamp according to claim 1, wherein the aiming mechanism further comprises a nut member screwed onto the aiming screw, and a nut sliding guide to carry the nut member and formed integrally with the lamp body and extended in parallel with the aiming screw.

13. The reflector movable type headlamp according to claim 1, wherein the elastic locking portion includes locking pieces in a shape of a tongue piece.

* * * * *